(12) United States Patent
Perdicaro

(10) Patent No.: US 10,303,991 B2
(45) Date of Patent: May 28, 2019

(54) MODIFYING AN INKJET RASTER IMAGE FOR A VISIBLE INDEPENDENT EFFECT

(71) Applicant: Hewlett-Packard Development Company, L.P., Houston, TX (US)

(72) Inventor: Frank Perdicaro, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/569,277

(22) PCT Filed: Jul. 27, 2015

(86) PCT No.: PCT/US2015/042232
§ 371 (c)(1),
(2) Date: Oct. 25, 2017

(87) PCT Pub. No.: WO2017/019011
PCT Pub. Date: Feb. 2, 2017

(65) Prior Publication Data
US 2018/0121772 A1  May 3, 2018

(51) Int. Cl.
G06K 15/02 (2006.01)
B41J 2/21 (2006.01)
G06K 15/10 (2006.01)

(52) U.S. Cl.
CPC ........ G06K 15/1881 (2013.01); B41J 2/2103 (2013.01); G06K 15/102 (2013.01)

(58) Field of Classification Search
CPC .. G06K 15/1881; G06K 15/102; B41J 2/2103
See application file for complete search history.

(56) References Cited

U.S. PATENT DOCUMENTS

| | | |
|---|---|---|
| 5,699,102 A | 12/1997 | Ng et al. |
| 2009/0068971 A1 | 3/2009 | Laaspere et al. |
| 2010/0053245 A1 | 3/2010 | Chandu et al. |
| 2011/0057976 A1 | 3/2011 | Hatanaka et al. |
| 2013/0286074 A1 | 10/2013 | Chandu et al. |
| 2013/0314750 A1 | 11/2013 | Krol |
| 2014/0253975 A1* | 9/2014 | Robinson ........... G06K 15/1881 358/2.1 |
| 2014/0285568 A1 | 9/2014 | Loccufier et al. |

FOREIGN PATENT DOCUMENTS

| | | |
|---|---|---|
| JP | 62236251 | 10/1987 |
| JP | 2001001573 | 1/2001 |

OTHER PUBLICATIONS

Gooran, Sasan. "Hybrid halftoning, a useful method for flexography." Journal of Imaging Science and Technology 49, No. 1 (2005): 85-95.

* cited by examiner

*Primary Examiner* — Sharon A. Polk
(74) *Attorney, Agent, or Firm* — Steven R. Ormiston (57) ABSTRACT

In one example, a method for an inkjet printer that includes: converting original image data to rasterized data for printing with an inkjet printer; performing a first halftoning operation to modify the rasterized data for a visible independent effect, generating modified rasterized data; and performing a second halftoning operation on the modified rasterized data to generate halftone data for printing the image with the visible independent effect.

13 Claims, 6 Drawing Sheets

MODIFYING AN INKJET RASTER IMAGE FOR A VISIBLE INDEPENDENT EFFECT

BACKGROUND

Halftone printing simulates continuous tones using patterns of dots. The dots may vary in size, shape and/or distribution to achieve the desired visual effect in the printed image.

DRAWINGS

The same part numbers designate the same or similar parts throughout the figures.

DESCRIPTION

Many commercial inkjet printers are capable of printing higher frequency halftone patterns compared to flexographic printing presses. Although higher frequency halftones usually are preferred, consumers of some types of packaging materials traditionally printed with a flexographic press have come to expect the look of lower frequency halftones. The lower frequency halftone patterns used to print with flexible rubber plates in a flexographic press produce visible effects in the printed image that may be desirable for some packaging and other printing applications. However, the image processing system in many inkjet printers does not support the creation of the lower frequency halftone patterns used in flexographic printing.

A new image processing technique has been developed for inkjet printing to simulate printing with a flexographic printer. In one example, rasterized image data is modified during image processing by halftone screens representing the halftone pattern of a flexographic printing plate, so that the printed image will look as if it was printed using a flexographic printer rather than an inkjet printer. In one implementation, the flexographic halftone screens are represented by contone values used to modify the rasterized image data and output contone data to the printer's halftoning engine. Thus, the modification for flexographic effect is essentially invisible to the normal halftoning process to help maintain high speed image processing.

Examples of the new image processing technique are not limited to simulating flexographic printing but may include producing other independent effects in the printed image. Specific halftone screens may be selected from a library of screens prepared in advance to achieve the desired effect for a particular inkjet print job. The effect may be obtained without modifying the input/original image data. That is to say, the customer's original artwork need not be altered to achieve the desired effect in the printed image.

The examples shown in the figures and described herein illustrate but do not limit the scope of the patent, which is defined in the Claims following this Description.

As used in this document, an "independent" effect means an effect that is not part of the original image data received by a printer's raster image processor.

Figure 1:
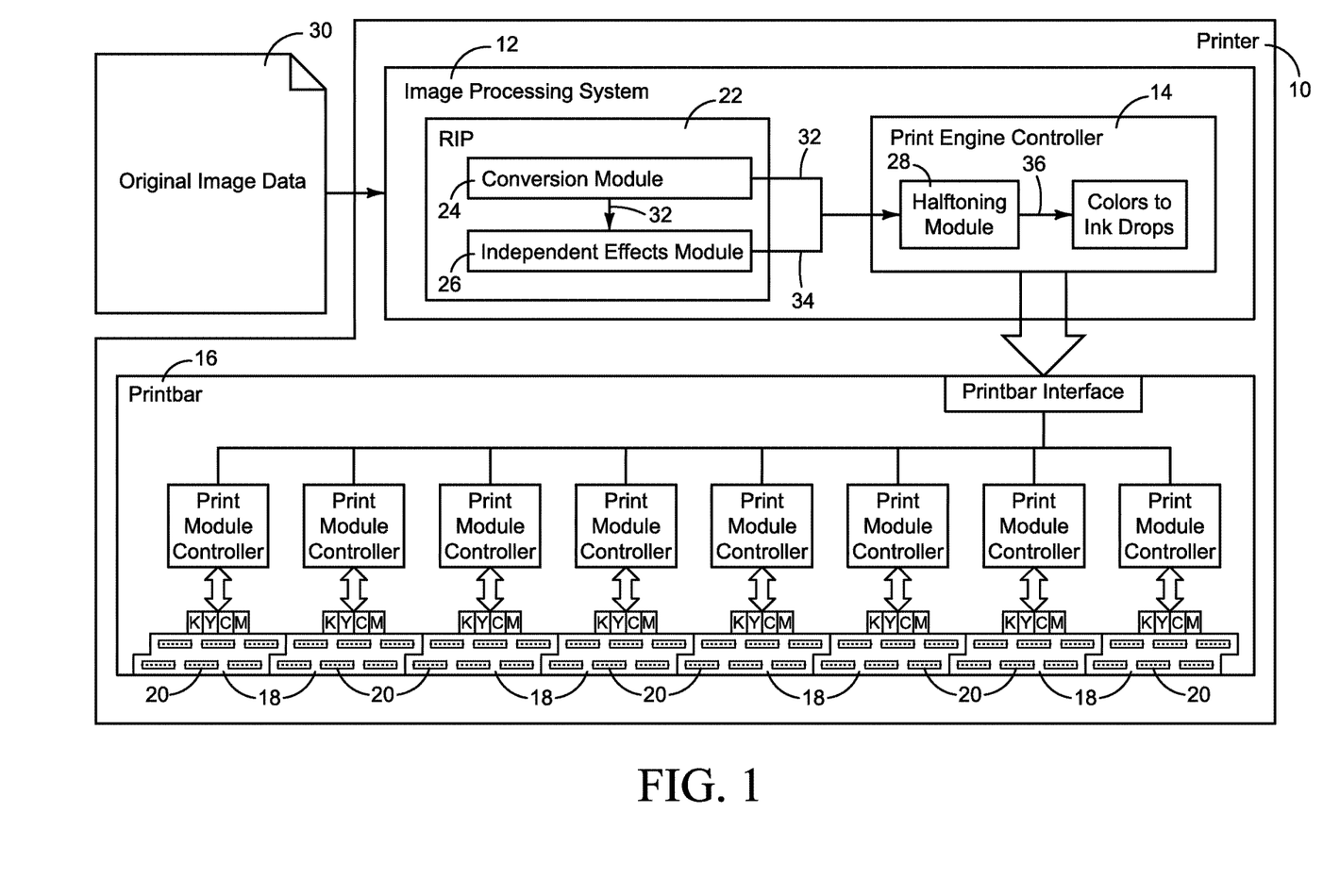
FIG. 1 is a block diagram illustrating an inkjet printer with an image processing system implementing one example of a RIP (raster image processor) module to produce a flexographic or other independent effect in the printed image.
Figure 2:
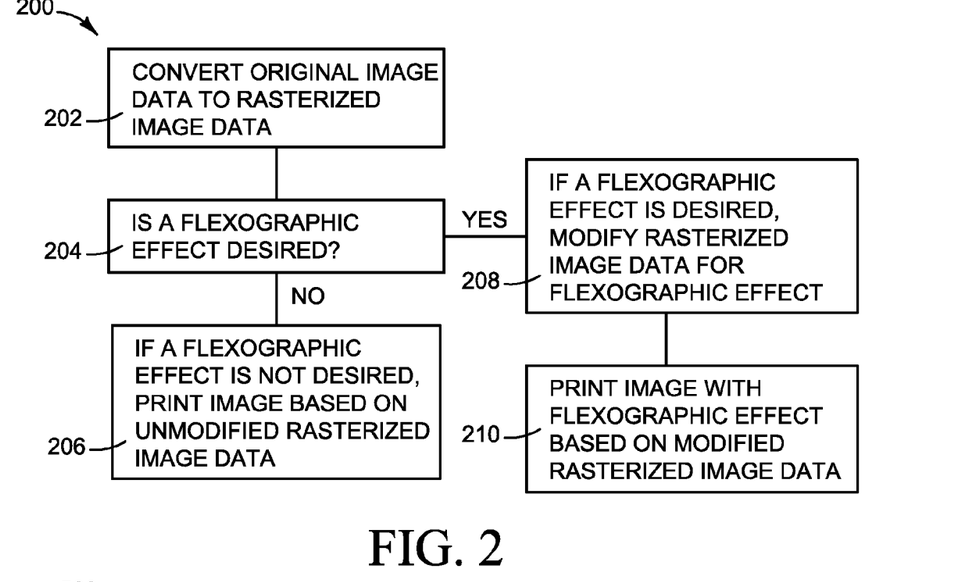
FIG. 2 is a flow diagram illustrating one example of a method for processing image data for printing with a flexographic effect, such as might be implemented in the printer shown in FIG. 1.

FIG. 1 is a block diagram illustrating an inkjet printer 10 with an image processing system 12 implementing one example of a raster module to produce a flexographic or other independent effect in the printed image. FIG. 2 is a flow diagram illustrating one example of a method 200 for processing image data for printing with a flexographic effect, such as might be implemented in printer 10 shown in FIG. 1. Referring first to FIG. 1, printer 10 includes image processing system 12, a print engine controller 14 within system 12, and a print engine 16. In this example printer 10, print engine 16 is implemented as a modular print bar that includes a series of printhead modules 18 each with multiple printheads 20, such as might be used in a high speed commercial inkjet printing "press." Image processing system 12 includes a raster image processor (RIP) 22 with a color conversion module 24, an independent effects module 26, and a halftoning module 28. In this example, halftoning module 28 resides on print engine controller 14.

Each module 24, 26, 28 represents the programming (executable instructions) to perform the respective functions. Each module 24, 26, 28 may be implemented as a distinct programming element and/or some or all of modules 24, 26, 28 may be implemented as parts of an integrated program or program element to perform the specified function(s). Also, each module 24, 26, 28 may itself include the processor(s), and other electronic circuitry and components to execute the programming.

Referring now also to the flow diagram of FIG. 2, original image data 30 received by system 12 is converted to rasterized (inkjet) image data 32 at color conversion module 24 (block 202 in FIG. 2). Processing at color conversion module 22 usually will include color conversion and mapping to generate continuous tone ("contone") rasterized image data 32 for printing with inkjet printer 10. (Adobe Postscript® is commonly used for printer raster image processing, although other page description languages could be used.) If no flexographic effect is desired, at block 204 in FIG. 2, contone raster data 32 is passed unmodified to halftoning module 28 for normal (un-effected) printing based on unmodified raster data 32 (block 206 in FIG. 2). If a flexographic effect is desired, at block 204 in FIG. 2, contone raster data 32 is passed to flexographic effects module 26 and modified to produce the desired effect (block 208 in FIG. 2), for example as described below with reference to FIGS. 5 and 6. Modified raster data 34 is passed to halftoning module 28 for printing with a flexographic effect based the modified data 34 (block 210 in FIG. 2).

Halftoning is the process of approximating continuous tone colors with a limited number of discrete colors. The colors that printer 10 cannot print directly are simulated using patterns of pixels in the available colors. Most color inkjet printers print with cyan, magenta, yellow and black (CMYK) color ink. The input to halftone module 28 is contone data 32 or 34, usually 8 bits of data per pixel in each color plane, and the output from module 28 is halftone data 36 that can be used to drive printheads 20, usually 1 or 2 bits of data per pixel in each color plane. Any suitable halftoning technique may be implemented at module 28. Also, while halftoning module 28 resides on printer controller 14 in FIG. 1, other configurations are possible. For example, halftoning module 28 could be implemented as part of RIP 22. And, although controller 14 is part of image processing system 12 in FIG. 1, some printer control functions may be performed outside of the image processing system. Thus, the configuration of printer 10 shown in FIG. 1 is just one example configuration that may be used to implement the functionality of conversion module 24, a flexographic or other independent effects module 26, and halftoning module 28.

Figure 3:
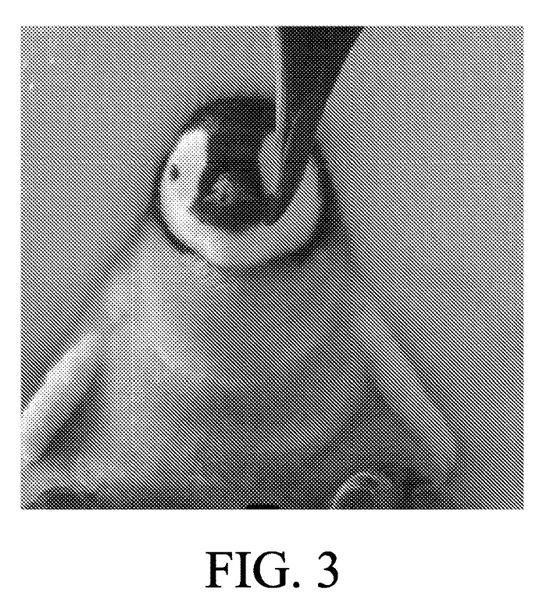
FIG. 3 illustrates an example of un-effected image printed with an inkjet printer based on unmodified rasterized image data.
Figure 4:
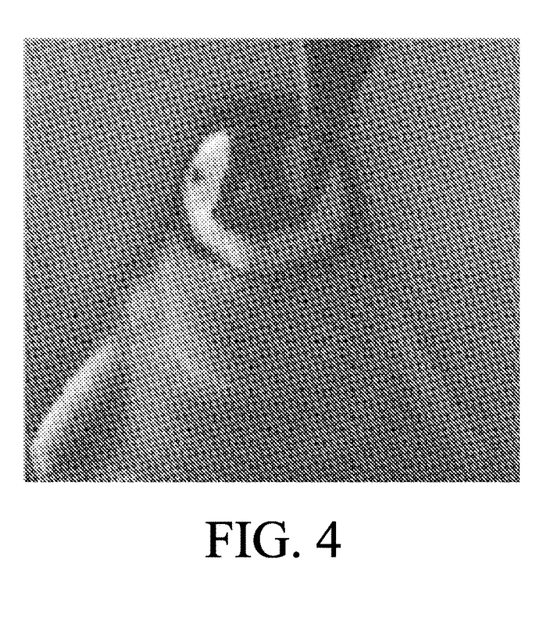
FIG. 4 illustrates the image of FIG. 3 printed with the same inkjet printer with an example of a flexographic effect based on modified rasterized image data.

The halftone pattern created by printing with the flexible rubber plates used in flexographic printing press is often visible to the naked eye. FIG. 3 illustrates an un-effected image printed with an inkjet printer based on unmodified rasterized image data (e.g., block 206 in FIG. 2). FIG. 4 illustrates the same image printed with the same inkjet printer with a flexographic effect based on modified rasterized image data (e.g. blocks 208 and 210 in FIG. 2). The image printed with a flexographic effect in FIG. 4 appears grainy compared to the unaffected image in FIG. 3. (The images in FIGS. 3 and 4 are magnified to more clearly show the flexographic effect.)

The halftone pattern created by printing with flexographic printing plates may be replicated using a set of halftone screens (one for each color plane) to modify raster data for inkjet printing. In one specific implementation, described in detail below with reference to FIGS. 5 and 6, the flexographic halftone screens are adapted to output contone data (modified rasterized data 34 in FIG. 1) so that subsequent halftoning at module 28 may proceed as usual. Thus, the modification for flexographic effect is transparent to the normal halftoning process to help maintain higher speed processing.

Figure 5:
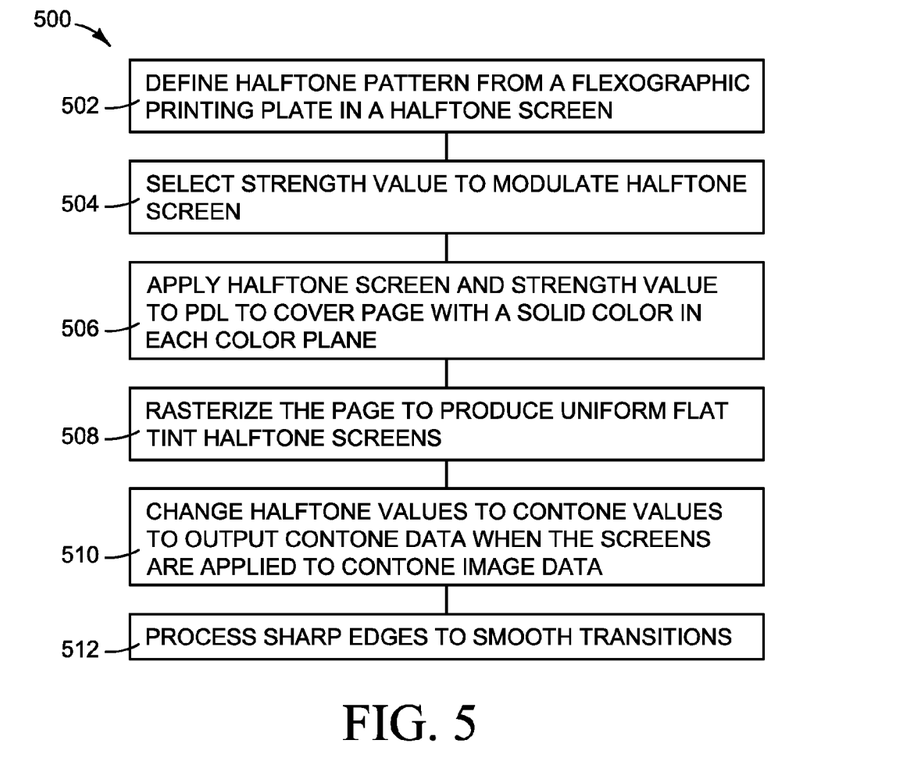
FIG. 5 is a flow diagram illustrating one example of a method for developing halftone screens to modify inkjet raster image data for a flexographic effect.
Figure 6:
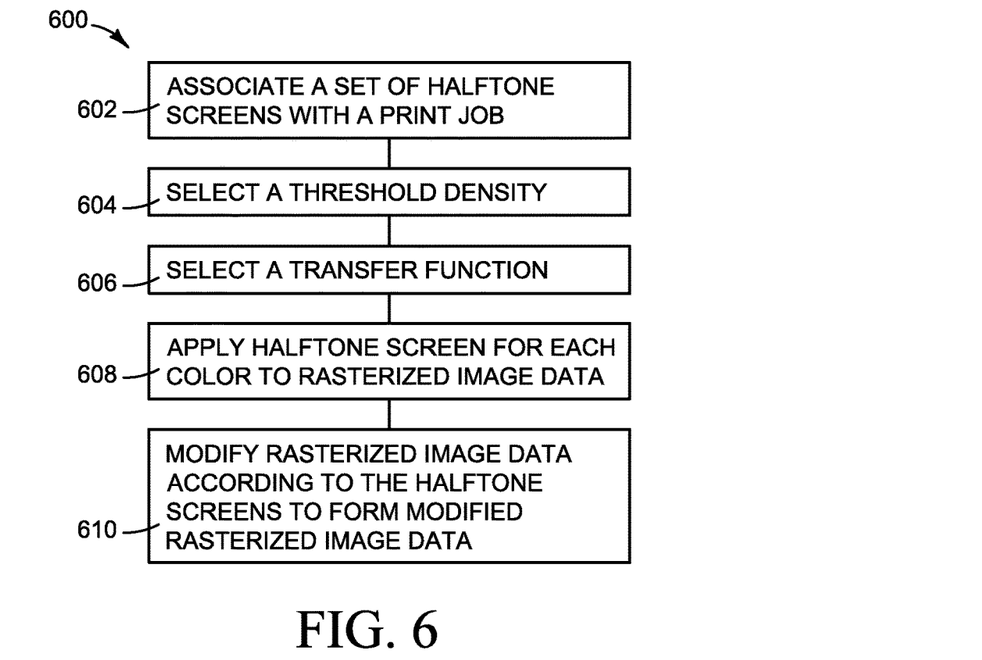
FIG. 6 is a flow diagram illustrating one example of a method for applying halftone screens, developed using the method of FIG. 5 for example, to modify raster image data for a flexographic effect.

FIG. 5 illustrates one example of a method 500 for developing a set of halftone screens to modify raster image data for a flexographic effect. FIG. 6 illustrates one example of a method 600 for applying a set of halftone screens, developed using the method of FIG. 5 for example, to modify raster image data at block 208 in FIG. 2. Referring first to FIG. 5, the halftone pattern from a flexographic printing plate is defined in a halftone screen at block 502. Any suitable halftoning parameters may be used to describe the flexographic pattern including, for example, frequency, screen angle, spot function and threshold array. A strength value may be selected to modulate the halftone screen to achieve the desired effect in the inkjet printed image, as shown at block 504 in FIG. 5. For example, the strength value may range from 0 to 1, where 0 results in no image (i.e., a blank page), 0.5 results in a 50% halftone of the original image, and 1.0 results in no modification to the original image. The halftone screen and strength value are applied to cover the page with a solid color in each color plane, e.g. CMYK, (block 506) and the page is rasterized to produce a uniform flat tint halftone screen for each color plane (block 508).

Then, at block 510, the halftone values in each screen are changed to contone values to output contone data when the screens are applied to contone image data 32 in FIG. 1. For example, each 1 bit halftone value in the flexographic halftone screen is changed to an 8 bit value by multiplying the value by 255—a 0 value remains 0 and a 1 value become 255. If desired, the sharp edges of the halftone dots in the flexographic effects screens may be processed to smooth transitions (block 512), for example by applying a Gaussian filter of half the frequency used for rasterizing the halftone screens. Application of the flexographic "halftone" screens developed with the method of FIG. 5 will output contone data 34 to halftoning module 28. Accordingly, the format of the data input to halftoning module 28 is the same whether it is received directly from conversion module 24 or indirectly through flexographic effects module 26. The flexographic effect reflected in the modified rasterized image data 34 in FIG. 1 is "disguised" as contone data so that the effect is transparent to halftoning module 28 and halftoning module 28 processes the input data as usual.

Referring now to FIG. 6, which illustrates a method 600 for applying halftone screens such as those developed using the method of FIG. 5, a set of halftone screens (one for each color plane) is associated with an incoming print job at block 602 to produce the desired flexographic or other independent effect. The association at block 602 may be implemented, for example, by associating one set of halftone screens with the entire print job or by associating a set of halftone screens with only a part of a print job. Different halftone screens could be associated with different parts of a print job to produce different effects. Thresholding may be desirable in some implementations, for example to keep solid colors solid. Thus, a threshold density may be selected at block 604 to disable the halftone screen modifications at color saturations above the threshold. For example, a threshold density of 95% may be selected at block 604 as a proxy for solid colors to disable the halftone screen modifications for pixels in the raster image with an ink density (saturation) at or above 95%.

In addition, a transfer function may be selected at block 606 to adjust ink density for pixels below the threshold. For example, a linear transfer function may be selected at block 606 with a balance point at 10% ink density. For pixels in the raster image with an ink density below the threshold and at or above the balance point (10% in this example), the pixel is modified to increase ink density in an amount corresponding to the linear transfer function. If the function line is flat, the density of each pixel above the balance point is boosted the same amount. If the function line is sloped, higher density pixels above the balance point are boosted more than lower density pixels. For pixels in the raster image with an ink density below 10%, the pixel is modified to decrease the ink density in an amount corresponding to the linear transfer function. The transfer function and balance point may be varied, for example, based on the halftoning strength set at block 504 in FIG. 5. For lower strength values that give more dense halftone screening (and a less dense pattern of pixels), a higher power transfer function may be desirable to increase the intensity of pixels that remain after screening.

Still referring to FIG. 6, after each page of the original image data is rasterized and color separations produced, for example at block 202 in FIG. 2, the halftone screen for each color is applied to each pixel in the raster image (block 608 in FIG. 6) and the raster image modified according to the halftone screen (block 610), subject to any threshold level and transfer function established in blocks 604 and 606. After the halftone screen has been applied to all pixels in all color planes in all pages, the modified raster image is processed for printing, for example as described above with reference to FIGS. 1 and 2.

Figure 7:
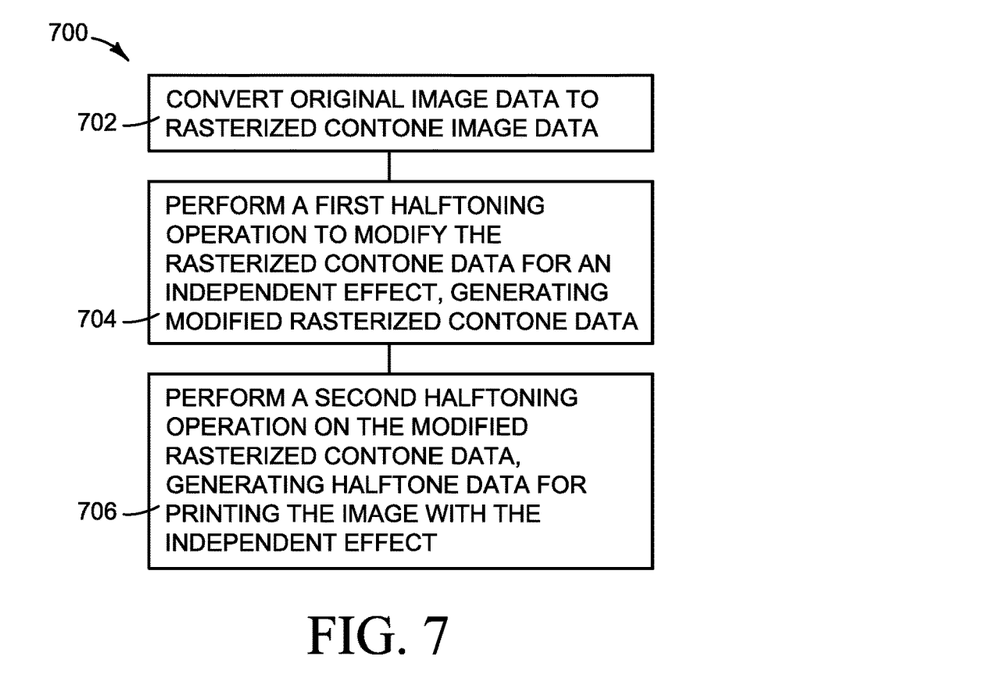
FIG. 7 is a flow diagram illustrating one example of a method for processing image data for printing with a flexographic or other independent effect.

FIG. 7 is a flow diagram illustrating one example method 700 for processing image data for printing with a flexographic or other independent effect, such as might be implemented in printer 10 shown in FIG. 1. (The part numbers in the following description refer to FIG. 1.) Referring to FIG. 7, original image data 30 received by system 12 is converted to rasterized image data 32 at color conversion module 24 (block 702). As noted above, processing at color conversion module 22 usually will include color conversion and mapping to generate continuous tone ("contone") rasterized image data 32, for example using Adobe Postscript®. A first halftoning operation is performed at independent effects module 26 to modify contone raster data 32 for an independent effect, generating modified contone raster data 34 (block 704). The operation performed at module 26 is referred to as a "halftoning" operation because the effect is to halftone the image represented by raster data 32 even though the output of module 26 is contone data. The halftoning operation of block 504 may be implemented, for example, using a set of halftone screens formed with method 500 in FIG. 5. A second halftoning operation is performed at halftoning module 28 on modified contone raster data 34, generating halftone data 36 for printing the image with a flexographic or other independent effect (706).

Figure 8:
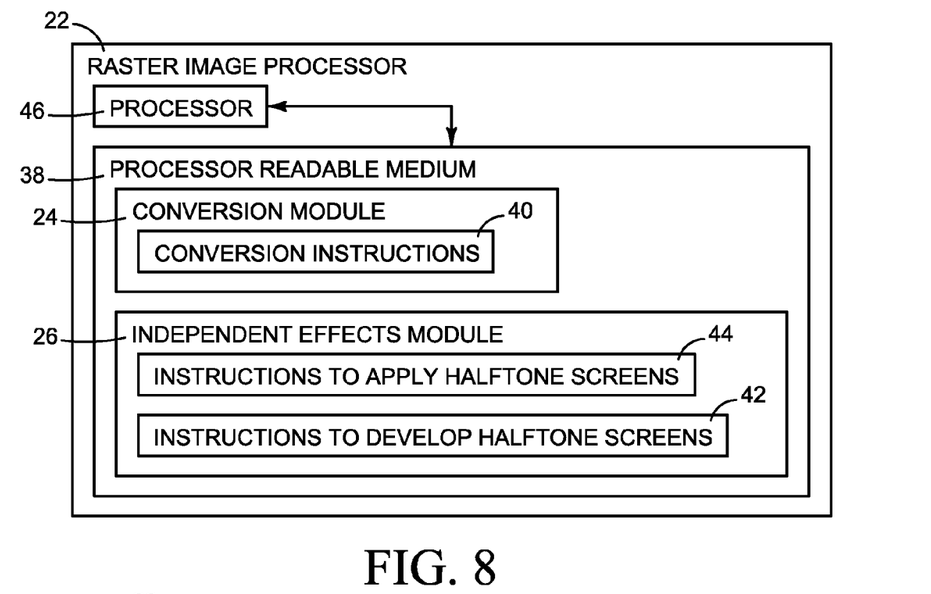
FIG. 8 is a block diagram illustrating one example of a raster image processor (RIP), such as might be used to execute the methods shown in FIGS. 2, 5 and 6.

FIG. 8 is a block diagram illustrating one example of a raster image processor (RIP) 22, such as might be used to execute the methods shown in FIGS. 2, 5 and 6. Referring to FIG. 8, RIP 22 includes a conversion module 24 and an independent effects module 26 residing on a processor readable medium 38. Conversion module 24 includes conversion instructions 40 to convert original image data to rasterized image data, for example as described above with reference to FIG. 2. Independent effects module 26 includes instructions 42, 44 to develop and apply halftone screens to modify rasterized image data to produce a flexographic or other independent effect, for example as described above with reference to FIGS. 5 and 6. RIP 22 also includes a processor 46 to read and execute instructions 40, 42, and 44 on medium 38.

A processor readable medium 38 is any non-transitory tangible medium that can embody, contain, store, or maintain instructions 40, 42, and 44 for use by a processor 46. Processor readable media include, for example, electronic, magnetic, optical, electromagnetic, and semiconductor media and may be embodied, for example, in a hard drive, ASIC, random access memory (RAM), read-only memory (ROM), and flash drives, memory cards and sticks and other portable storage devices.

Figure 9:
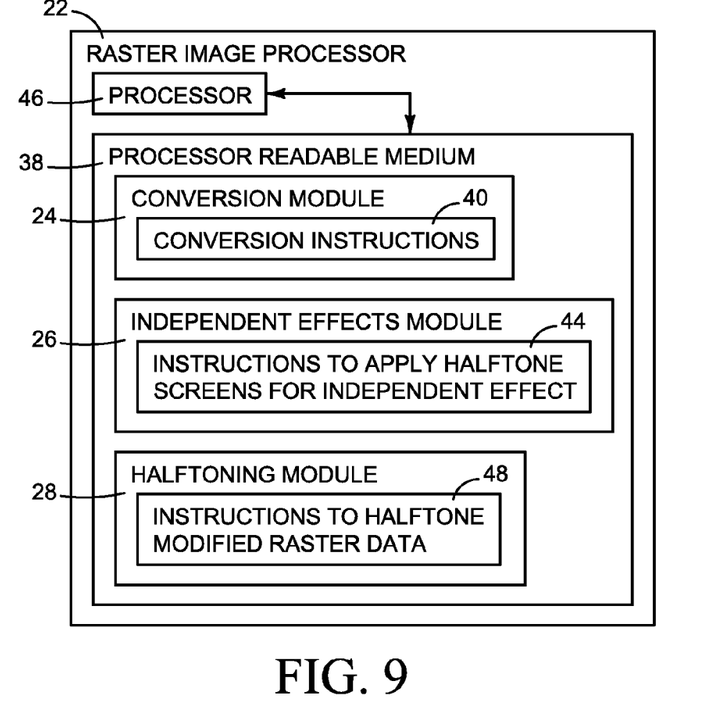
FIG. 9 is a block diagram illustrating another example of a raster image processor (RIP), such as might be used to execute the method shown in FIG. 7.

In the example RIP shown in FIG. 9, which may be used to execute the method shown in FIGS. 7, RIP 22 also includes a halftoning module 28 with instructions 48 to perform a halftoning operation on modified rasterized data generated by the execution of instructions 44 on independent effects module 26.

Figure 10:
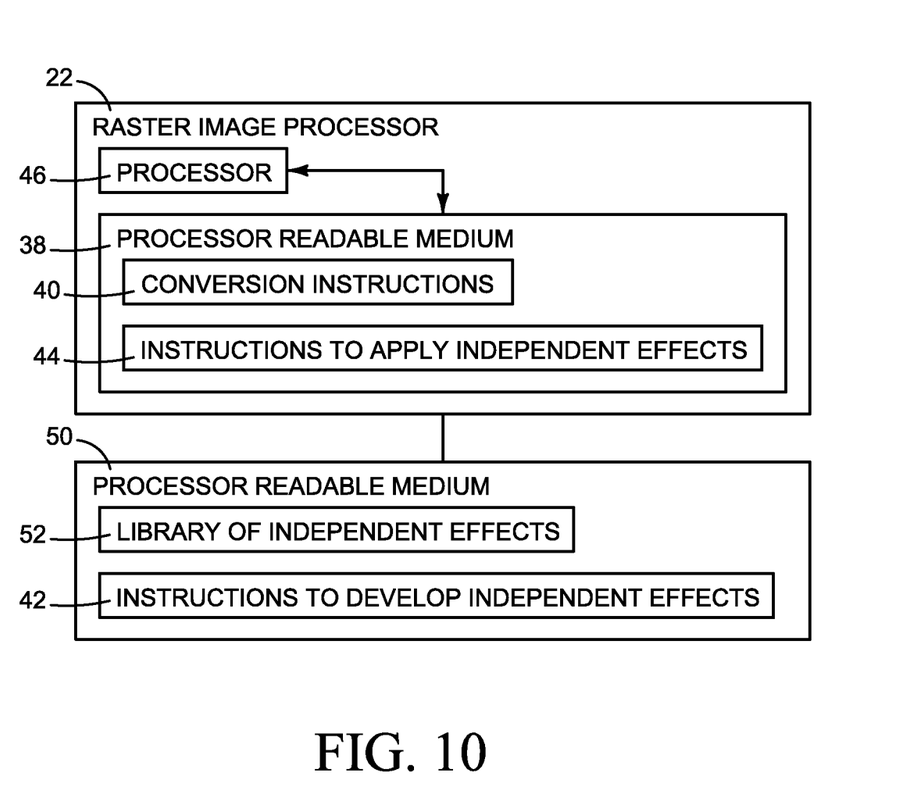
FIG. 10 is a block diagram illustrating one example of a processor readable medium with instructions to develop independent effects in an inkjet raster image.

While developer instructions 42 are shown within independent effects module 26 in RIP 22 in FIGS. 8 and 9, instructions 42 could be implemented separately from RIP 22. In FIG. 10, for example, the instructions 42 to develop independent effects reside on a separate processor readable medium 50 operatively connected (or connectable) to RIP 22. Also, in this example, medium 50 includes a library of halftone screens or other independent effects 52 developed with instructions 42 and accessible to independent effects module 26 on RIP 22.

As noted at the beginning of this Description, the examples shown in the figures and described above illustrate but do not limit the scope of the patent. Other examples are possible. Therefore, the foregoing description should not be construed to limit the scope of the patent, which is defined in the following Claims.

"A" and "an" as used in the Claims means one or more.

The invention claimed is:

1. A method for an inkjet printer, comprising:
   converting original image data to rasterized data for printing with an inkjet printer;
   performing a first halftoning operation to modify the rasterized data for a visible independent effect, generating modified rasterized data; and
   performing a second halftoning operation on the modified rasterized data to generate halftone data for printing the image with the visible independent effect.

2. The method of claim 1, where the visible independent effect simulates printing the image with a flexographic printer.

3. The method of claim 1, where:
   converting original image data to rasterized data for printing with an inkjet printer includes converting the original image data to rasterized contone data for printing with an inkjet printer;
   performing a first halftoning operation to modify the rasterized data for a visible independent effect, generating modified rasterized data, includes performing a first halftoning operation to modify the rasterized contone data for a visible independent effect, generating modified rasterized contone data; and
   performing a second halftoning operation on the modified rasterized data to generate halftone data for printing the image with the visible independent effect includes performing a second halftoning operation on the modified rasterized contone data to generate halftone data for printing the image with the visible independent effect.

4. The method of claim 1, comprising printing the image with the visible independent effect with an inkjet printer.

5. A non-transitory processor readable medium having instructions thereon that when executed by a processor cause the processor to modify inkjet raster data for a flexographic effect.

6. The medium of claim 5, where the instructions to modify inkjet raster data include instructions to apply a halftone screen representing a flexographic printing plate to the inkjet raster data.

7. The medium of claim 6, where the instructions to modify inkjet raster data include instructions to define a halftone pattern from a flexographic printing plate with halftone values and change the halftone values to contone values to define the halftone screen.

8. The medium of claim 5 where the instruction to modify inkjet raster data include instructions to:
   perform a first halftoning operation to modify inkjet rasterized contone data for a flexographic effect and generate modified rasterized contone data; and
   perform a second halftoning operation on the modified rasterized contone data to generate halftone data for printing the image with the flexographic.

9. A raster image processor for an inkjet printer, comprising:
- a conversion module to convert original image data to rasterized image data to print with the inkjet printer; and
- an independent effects module to modify rasterized image data for a visible independent effect, the independent effects module including programming to:
  - associate a set of halftone screens with image data in a print job, each halftone screen representing the visible independent effect for a different color;
  - select a threshold density;
  - select a transfer function;
  - apply the halftone screen for each color, the threshold density, and the transfer function to the rasterized image data; and
  - modify the rasterized image data according to the halftone screens, the threshold density and the transfer function.

10. A raster image processor for an inkjet printer, comprising:
- a conversion module to convert original image data to rasterized image data to print with the inkjet printer; and
- an independent effects module to modify rasterized image data for a visible independent effect, the independent effects module including programming to:
  - define the independent effect in a halftone screen;
  - select a strength value to modulate the halftone screen;
  - apply the halftone screen and strength value to a page description language to cover a page with a solid color in each color plane;
  - rasterize the page to produce a set of uniform flat tint halftone screens;
  - apply the set of uniform flat tint halftone screens to the rasterized image data; and
  - modify the rasterized image data according to the set of uniform flat tint halftone screens.

11. An image processing method, comprising:
rasterizing an image for printing with an inkjet printer, to form a rasterized image; and
modifying the rasterized image to simulate printing the image with a flexographic printer, to form a modified rasterized image.

12. The method of claim 11, where the modifying includes applying a halftone screen representing a flexographic printing plate to the rasterized image.

13. The method of claim 12, comprising printing the modified rasterized image with an inkjet printer.

* * * * *